US 6,677,262 B2

(12) United States Patent
Wataya et al.

(10) Patent No.: US 6,677,262 B2
(45) Date of Patent: Jan. 13, 2004

(54) RARE EARTH OXIDE, BASIC RARE EARTH CARBONATE, MAKING METHOD, PHOSPHOR, AND CERAMIC

(75) Inventors: Kazuhiro Wataya, Takefu (JP); Miyuki Ohyama, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 99 days.

(21) Appl. No.: 09/897,463

(22) Filed: Jul. 3, 2001

(65) Prior Publication Data

US 2002/0017635 A1 Feb. 14, 2002

(30) Foreign Application Priority Data

Jul. 5, 2000 (JP) .......................... 2000-203549
Dec. 22, 2000 (JP) .......................... 2000-391055

(51) Int. Cl.$^7$ .............................................. H01F 1/053
(52) U.S. Cl. ................. 501/152; 423/263; 252/301.4 R
(58) Field of Search .................... 501/152; 423/263; 252/301.4 R

(56) References Cited

U.S. PATENT DOCUMENTS 5,879,647 A    3/1999  Wataya et al.
6,180,029 B1 * 1/2001  Hampden-Smith et al. ...... 252/301.4 R
2001/0017365 A1 * 8/2001  Kobayashi et al. ... 252/301.4 R

FOREIGN PATENT DOCUMENTS

| EP | 849899 | * | 5/1998 |
| JP | 8-59233 |   | 3/1996 |
| JP | 10-139427 |   | 5/1998 |
| JP | 11-35320 | * | 2/1999 |
| JP | 11-79742 | * | 3/1999 |

* cited by examiner

*Primary Examiner*—C. Melissa Koslow
(74) *Attorney, Agent, or Firm*—Millen, White, Zelano & Branigan, P.C.

(57) ABSTRACT

A rare earth oxide in the form of substantially spherical particles having a Fisher diameter Df of 0.5 $\mu$m<Df<2.0 $\mu$m and a photomicrography particle diameter De of 0.5 $\mu$m<De<2.0 $\mu$m is prepared by heating and ripening an aqueous solution of water-soluble rare earth salts at 80° C. or higher while adding urea to the aqueous solution so as to keep a urea concentration of 10–50 g/liter, thereby forming a basic rare earth carbonate, and firing the basic rare earth carbonate.

27 Claims, 8 Drawing Sheets

1100°C

1200°C

1400°C

1650°C

1850°C

RARE EARTH OXIDE, BASIC RARE EARTH CARBONATE, MAKING METHOD, PHOSPHOR, AND CERAMIC

This invention relates to a rare earth oxide, a basic rare earth carbonate, methods for preparing them, and a phosphor and ceramic obtained therefrom.

BACKGROUND OF THE INVENTION

Among rare earth oxides, a spherical rare earth oxide having an average particle diameter of 0.2 to 1 μm as measured by a Fisher sub-sieve sizer (this average particle diameter is sometimes referred to as Fisher diameter, hereinafter) is obtainable by a known method as disclosed in Wataya et al., U.S. Pat. No. 5,879,647 (JP-A 10-139427). Also, a method for preparing finer spherical particles having an average particle diameter of 0.1 to 0.3 μm is known from JP-A 10-139427. A method for preparing spherical particles having an average particle diameter of 2 to 6 μm is disclosed, for example, in JP-A 8-59233.

These methods, however, are difficult to produce spherical rare earth oxide particles having a Fisher diameter from more than 0.5 μm to less than 2 μm.

Yttrium-europium oxide phosphors and yttrium-gadolinium-europium oxide phosphors are used in plasma display and medical diagnostic x-ray systems as the red phosphor. The plasma display is promising as a large-size flat display panel. Yttrium-europium oxide phosphors and yttrium-gadolinium-europium oxide phosphors are attractive as plasma display red phosphors having a high luminous efficiency to excitation light of 147 nm emitted by xenon plasma.

While yttrium-gadolinium-europium borate phosphors are also known as the red phosphor for plasma displays, the yttrium-europium oxide phosphors and yttrium-gadolinium-europium oxide phosphors are potential candidates since they are superior in color purity and lifetime despite a lower luminous efficiency.

For medical diagnostic x-ray systems, yttrium-gadolinium-europium oxide phosphors are regarded promising because of high luminous efficiency to x-rays.

For such display panels as plasma display panels (PDP), to increase their brightness is an important task in improving display performance.

The brightness of panels can be increased, for example, by increasing the brightness of phosphor itself. It is believed that the brightness of panels is largely affected by the coating property of phosphor to cells. With respect to the coating property of phosphor, those phosphors which can be applied to plasma display cells in a uniform, least irregular state are regarded preferable. With respect to the shape of phosphor, particles of small size, equal diameter and identical shape are regarded preferable because uniform coating property is improved.

The particle size and shape of phosphor, especially the particle size of phosphor, depend on the particle size of a raw material. In general, using a raw material having a less variation of particle diameter or a sharper particle size distribution, a phosphor having a sharper particle size distribution is obtained. The raw material powder is thus required to have a sharper particle size distribution.

However, a microscopic observation of conventional raw material oxide revealed that even a raw material powder having a sharper particle size distribution contained particles of differing size. Such a raw material powder was regarded to have a sharper particle size distribution for the mere reason that the difference in particle size was relatively small or particles had somewhat similar shapes. The phosphor prepared from such a raw material powder contains particles of differing size.

SUMMARY OF THE INVENTION

An object of the invention is to provide a spherical rare earth oxide and spherical basic rare earth carbonate having an average particle diameter from more than 0.5 μm to less than 2 μm which is difficult to obtain in the prior art, methods for preparing them, a phosphor and ceramic obtained therefrom.

Another object of the invention is to provide a phosphor having a uniform particle diameter and a sharp particle size distribution, suitable for typical use as a red phosphor in displays and in medical diagnostic x-ray systems, and a method for preparing the same.

From a study on precipitating conditions including controlled concentrations of rare earth ions, carbonic acid or carbonate ions, and ammonia or ammonium ions in aqueous solution, we have reached the present invention. More specifically, when rare earth oxides are used as a raw material to form ceramics and phosphors, the characteristics of products are largely affected by the particle shape, particle size and particle size distribution of rare earth oxides. The rare earth oxide particles have a variety of shapes including irregular, tabular, angular, and spherical shapes. Of these, spherical particles are one of the particle shapes regarded most preferable as the raw material. Among such spherical particles of rare earth oxide, a fraction of particles having a diameter from more than 0.5 μm to less than 2 μm has never been available in the art, and we tried to obtain this fraction of particles. We reached the basic concept of synthesis that better results are obtainable by generating a suitable amount of particle nuclei serving as crystal seeds in a liquid phase and thereafter, controlling the concentration of a precipitant in the liquid phase such that the initially generated particle nuclei may be grown without generating new particle nuclei. Since amorphous particles were believed preferable to obtain spherical particles, a choice was made of basic rare earth carbonates from which amorphous rare earth salts were readily obtainable. It was found that an effective means for obtaining a basic carbonate was to homogeneously add ammonia or ammonium ions and carbonic acid or carbonate ions to a rare earth ion-containing liquid phase.

The addition of a precipitant is readily accomplished by adding urea to the solution and heating the solution at a temperature of 80° C. or higher.

However, the method of obtaining a precipitate of basic rare earth carbonate by adding urea to a solution of rare earth salt and heating the solution is difficult to produce particles having a Fisher diameter in excess of 1 μm because an excessive amount of precipitate forms in the solution if the concentration of urea in the solution is too high.

Paying attention to the change of the urea concentration in the solution, we have found that the number of particles generated in the solution at an initial stage of reaction can be reduced by adjusting the urea concentration so as not to become high, and that the initially generated particles can be grown larger by suppressing further particle generation after the initial stage of reaction.

Moreover, using a spherical rare earth oxide of uniform particle diameter and uniform particle shape having an average particle diameter of 0.5 to 2 μm which is obtained by the above method, we tried to produce a consistent yttrium-europium oxide phosphor or yttrium-gadolinium-europium oxide phosphor having a uniform particle diameter of 0.5 to 2 μm.

Nowadays, it becomes customary in the medical field to store digital radiographic data for diagnosis. To increase the resolution of diagnostic images, the phosphor is required to have a high luminous efficiency to x-rays, a fine particle size, luminous characteristics having a high sensitivity to the detector, and good coating property. We thus tried to produce a consistent yttrium-gadolinium-europium oxide phosphor having a uniform particle diameter of 0.5 to 2 μm as the phosphor capable of meeting these requirements.

We have found that a yttrium-europium or yttrium-gadolinium-europium oxide phosphor having a uniform particle diameter can be produced by heating a consistent, spherical, coprecipitated yttrium-europium or yttrium-gadolinium-europium oxide having a particle diameter of 0.5 to 2 μm, obtained as above, at a temperature of 1,100 to 1,800° C. Advantageously, the oxide used as the raw material has a so small particle diameter of 0.5 to 2 μm that crystal growth is facilitated. The oxide particles used as the raw material have a uniform size so that equal crystal growth occurs among individual particles during heat treatment at the same temperature. A phosphor can be produced by causing the starting oxide to undergo crystal growth without a need for admitting a flux which is commonly used in phosphor production such as boric acid, barium chloride or ammonium chloride. This leads to the advantage of simplifying the phosphor producing process. The phosphor thus obtained is useful as a red phosphor in plasma display systems and as a phosphor in medical diagnostic x-ray systems.

The above and other objects are attained by the present invention which is defined below.

(1) A rare earth oxide in the form of substantially spherical particles having an average particle diameter Df of $0.5 \mu m < Df < 2.0 \mu m$ as measured by a Fisher sub-sieve sizer and a particle diameter De of $0.5 \mu m < De < 2.0 \mu m$ as observed under an electron microscope.

(2) The rare earth oxide of (1) which contains at least 60 mol % of an oxide of at least one element selected from the group consisting of Y, Gd, Tb, Dy, Ho, Er, Tm, Yb, and Lu and less than 40 mol % of an oxide of at least one element selected from the group consisting of La, Ce, Pr, Nd, Sm, and Eu.

(3) A basic rare earth carbonate in the form of substantially spherical amorphous particles having an average particle diameter Df of $1.0 \mu m < Df < 3.0 \mu m$ as measured by a Fisher sub-sieve sizer and a particle diameter De of $1.0 \mu m < De < 3.0 \mu m$ as observed under an electron microscope.

(4) The basic rare earth carbonate of (3) which contains at least 60 mol % of a basic carbonate of at least one element selected from the group consisting of Y, Gd, Tb, Dy, Ho, Er, Tm, Yb, and Lu and less than 40 mol % of a basic carbonate of at least one element selected from the group consisting of La, Ce, Pr, Nd, Sm, and Eu.

(5) A method for preparing the rare earth oxide of (1) or (2), comprising firing the basic rare earth carbonate of (3).

(6) A method for preparing the rare earth oxide of (1) or (2), comprising the steps of heating and ripening an aqueous solution of water-soluble rare earth salts at a temperature of at least 80° C. while adding urea to the aqueous solution so as to keep the concentration of urea at a substantially constant level of up to 50 g/liter, thereby forming a basic rare earth carbonate; and firing the basic rare earth carbonate.

(7) The method of (5) or (6) wherein the firing temperature is at least 600° C.

(8) A method for preparing the basic rare earth carbonate of (3), comprising the steps of adding urea to an aqueous solution of water-soluble rare earth salts so as to keep the concentration of urea at a substantially constant level of up to 50 g/liter; and then heating and ripening the aqueous solution at a temperature of at least 80° C.

(9) The method of (8) further comprising the step of preparing said aqueous solution of water-soluble rare earth salts using deionized water having a silicon content of up to 0.5 ppm.

(10) A phosphor obtained from a rare earth oxide in the form of substantially spherical particles having an average particle diameter Df of $0.5 \mu m < Df < 2.0 \mu m$ as measured by a Fisher sub-sieve sizer and a particle diameter De of $0.5 \mu m < De < 2.0 \mu m$ as observed under an electron microscope.

(11) The phosphor of (10) which contains at least 60 mol % of an oxide of at least one element selected from the group consisting of Y, Gd, Tb, Dy, Ho, Er, Tm, Yb, and Lu and less than 40 mol % of an oxide of at least one element selected from the group consisting of La, Ce, Pr, Nd, Sm, and Eu.

(12) A consistent yttrium-europium oxide phosphor having a uniform particle diameter of 0.5 μm to 2 μm.

(13) The yttrium-europium oxide phosphor of (12) wherein the content of boron and barium combined is not greater than 20 ppm.

(14) A method for preparing a yttrium-europium oxide phosphor, comprising the step of heating a consistent, spherical, monodisperse, coprecipitated yttrium-europium oxide having a uniform particle diameter of 0.5 μm to 2 μm at a temperature between 1,100° C. and 1,800° C., thereby yielding a yttrium-europium oxide phosphor having the same particle diameter as the coprecipitated oxide.

(15) A consistent yttrium-gadolinium-europium oxide phosphor having a uniform particle diameter of 0.5 μm to 2 μm.

(16) The yttrium-gadolinium-europium oxide phosphor of (15) wherein the content of boron and barium combined is not greater than 20 ppm.

(17) A method for preparing a yttrium-gadolinium-europium oxide phosphor, comprising the step of heating a consistent, spherical, coprecipitated yttrium-gadolinium-europium oxide having a uniform particle diameter of 0.5 μm to 2 μm at a temperature between 1,100° C. and 1,800° C., thereby yielding a yttrium-gadolinium-europium oxide phosphor having the same average particle diameter as the coprecipitated oxide.

(18) A ceramic obtained from a rare earth oxide in the form of substantially spherical particles having an average particle diameter Df of $0.5 \mu m < Df < 2.0 \mu m$ as measured by a Fisher sub-sieve sizer and a particle diameter De of $0.5 \mu m < De < 2.0 \mu m$ as observed under an electron microscope.

(19) The ceramic of (18) which contains at least 60 mol % of an oxide of at least one element selected from the group consisting of Y, Gd, Tb, Dy, Ho, Er, Tm, Yb, and Lu and less than 40 mol % of an oxide of at least one element selected from the group consisting of La, Ce, Pr, Nd, Sm, and Eu.

DESCRIPTION OF THE PREFERRED EMBODIMENTS

Figure 1:
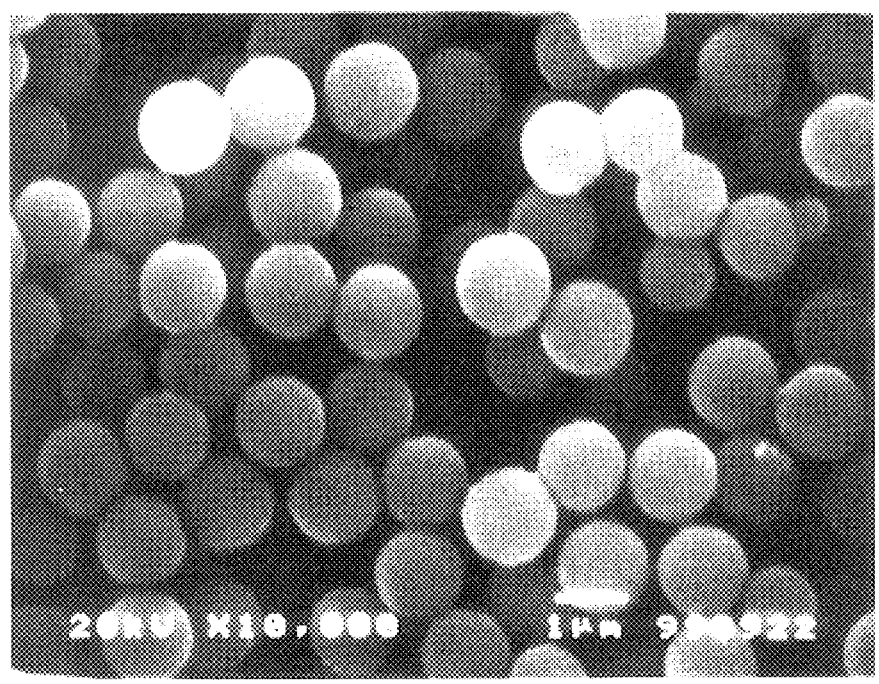
FIG. 1 is a photomicrograph of the oxide obtained in Example 1.
Figure 2:
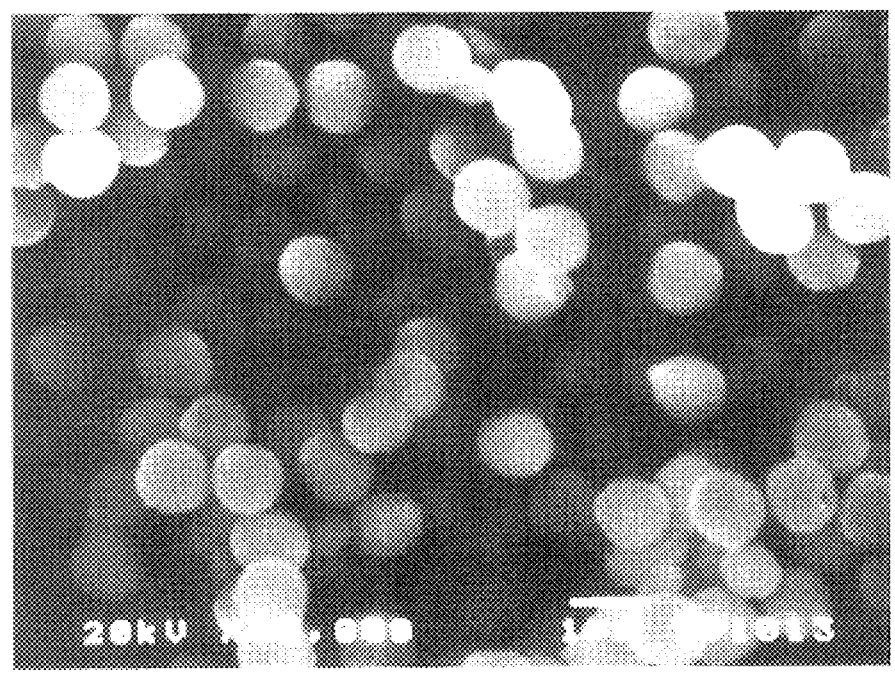
FIG. 2 is a photomicrograph of the oxide obtained in Example 2.
Figure 3:
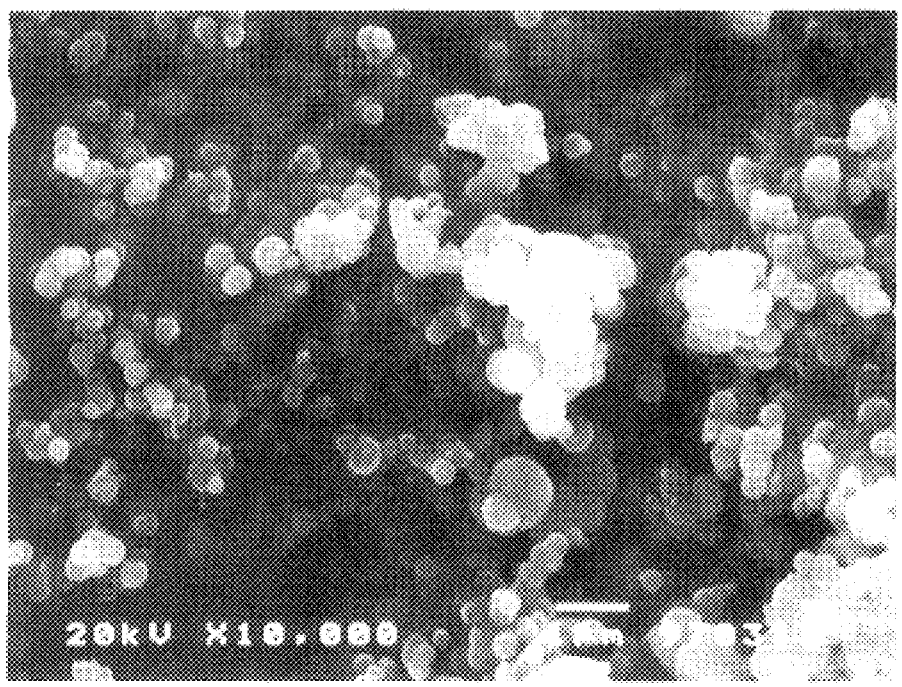
FIG. 3 is a photomicrograph of the oxide obtained in Comparative Example 1.
Figure 4:
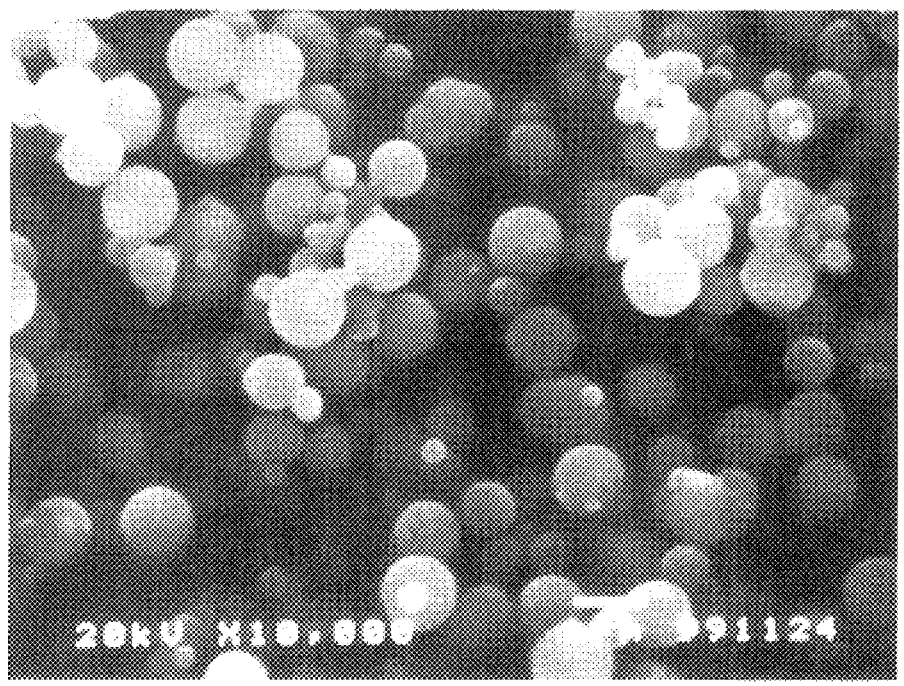
FIG. 4 is a photomicrograph of the oxide obtained in Comparative Example 2.

It is noted that Df represents the average particle diameter or Fisher diameter of particles as measured by a Fisher sub-sieve sizer, and De represents the particle diameter of particles as observed under an electron microscope.

The rare earth oxide of the invention should meet the requirements:

(1) substantially spherical particles;
(2) the Fisher diameter Df is in the range of 0.5 $\mu$m<Df<2.0 $\mu$m, and especially, 1.0 $\mu$m<Df<2.0 $\mu$m; and
(3) the particle diameter De is in the range of 0.5 $\mu$m<De<2.0 $\mu$m, and especially 1.0 $\mu$m<De<2.0 $\mu$m.

The basic rare earth carbonate of the invention should meet the requirements:

(1) substantially spherical particles;
(2) amorphous;
(3) the Fisher diameter Df is in the range of 1.0 $\mu$m<Df<3.0 $\mu$m; and
(4) the particle diameter De is in the range of 1.0 $\mu$m<De<3.0 $\mu$m.

It is noted that the term "substantially spherical particles" include true spherical ones and ellipsoidal ones approximate thereto and encompass particles having a maximum diameter/minimum diameter ratio of from 1.0 to 1.3.

The rare earth elements include Y, Gd, Tb, Dy, Ho, Er, Tm, Yb, Lu, La, Ce, Pr, Nd, Sm, Eu, etc. They may be used alone or in admixture of two or more. Preferably, the rare earth oxide contains at least 60 mol % of an oxide of at least one element selected from among Y, Gd, Tb, Dy, Ho, Er, Tm, Yb, and Lu and less than 40 mol % of an oxide of at least one element selected from among La, Ce, Pr, Nd, Sm, and Eu. Also preferably, the basic rare earth carbonate contains at least 60 mol % of a basic carbonate of at least one element selected from among Y, Gd, Tb, Dy, Ho, Er, Tm, Yb, and Lu and less than 40 mol % of a basic carbonate of at least one element selected from among La, Ce, Pr, Nd, Sm, and Eu.

The rare earth oxide and basic carbonate have a minimal variation of particle diameter as observed under an electron microscope.

The above-described rare earth oxide can be obtained by firing the above-described basic rare earth carbonate, which can, in turn, be produced by starting with water-soluble rare earth salts, preferably rare earth chlorides or nitrates, and adding urea to an aqueous solution of the salts to effect reaction.

In the latter process, the concentration of water-soluble rare earth salts is preferably 2 to 20 g/liter, especially 3 to 15 g/liter. Too low a concentration may entail poor productivity whereas too high a concentration may cause formation of finer particles.

On the other hand, the urea concentration should be 50 g/liter or lower, preferably 10 to 50 g/liter, and more preferably 25 to 50 g/liter of the solution. Since urea is lost by hydrolysis upon heating, it is desirable to replenish urea to the reaction solution in any suitable way. If the urea concentration in the solution is more than 50 g/liter, the solution allows new particles to generate so that the resulting particles lack uniformity. Even when the urea concentration is kept at 50 g/liter or lower, the generation of new particles is not completely suppressed, but the resulting particles are significantly improved in size uniformity. The urea concentration is maintained at a substantially constant level of not more than 50 g/liter during reaction and during replenishment of urea. It is preferred to maintain the urea concentration in the range of an initial or preset concentration of not more than 50 g/liter±20 g/liter, especially±10 g/liter.

The reaction temperature is preferably in the range from 80° C. to the boiling point of the solution, especially 90 to 100° C. The reaction time is not critical.

Most often, silicon, if contained in the aqueous solution, is incorporated into particles. For the purpose of reducing the silicon content of the resulting particles, deionized water used to form the aqueous solution should preferably have a silicon content of 0.5 ppm or lower.

The above process yields a slurry of spherical particles. By solid-liquid separation of the slurry, there is obtained an amorphous basic rare earth carbonate having a Fisher diameter of from more than 1 $\mu$m to less than 3 $\mu$m and a photomicrograph particle diameter of from more than 1 $\mu$m to less than 3 $\mu$m.

By firing this spherical, amorphous basic rare earth carbonate at a temperature of preferably at least 600° C., more preferably 600 to 1,200° C., even more preferably 700 to 1,000° C., there is obtained a rare earth oxide having a Fisher diameter of from more than 0.5 $\mu$m to less than 2 $\mu$m and a photomicrograph particle diameter of from more than 0.5 $\mu$m to less than 2 $\mu$m. Separately, by firing the basic carbonate or oxide at a higher temperature, for example, 1,500° C., there is obtained a rare earth oxide powder having very good crystallinity.

The oxide thus obtained is useful as a phosphor. For example, when the rare earth element used is a mixture of yttrium and europium, a phosphor useful as a red phosphor can be readily produced.

Alternatively, a red phosphor can be readily obtained by admixing the basic carbonate or oxide with a flux such as boric acid, barium chloride or ammonium chloride and firing the mixture at a temperature of 1,200° C. or higher.

The thus obtained rare earth oxide powder has an average particle diameter of from more than 0.5 μm to less than 2 μm, preferably 0.7 to 2 μm, more preferably about 1 to 2 μm and is useful as a phosphor for use in lamps, Brown tubes and displays such as PDP.

The consistent rare earth compounds of spherical shape having a substantially uniform particle diameter according to the invention are also useful in forming ceramic materials. Ceramic materials having a high sintered density are obtained therefrom.

In this way, a monodisperse, spherical basic rare earth carbonate having a uniform particle diameter of 1.0 μm to 3.0 μm which is difficult to produce in the prior art, and a monodisperse, spherical rare earth oxide having a uniform particle diameter of 0.5 μm to 2.0 μm can be obtained by relatively simple processes, and a phosphor and ceramic material can also be obtained by relatively simple processes using the carbonate or oxide as part or all of raw material.

Described below are the yttrium-europium oxide phosphor and yttrium-gadolinium-europium oxide phosphor according to the invention. These phosphors are monodisperse and have a uniform particle diameter of 0.5 to 2 μm. The term "particle diameter" used herein is a particle diameter as observed under an electron microscope. It is preferred that the phosphors have an average particle diameter or Fisher diameter as measured by a Fisher sub-sieve sizer of 0.5 to 2 μm at the same time. The term "uniform particle diameter" used herein means that when particles are observed under an electron microscope, at least 90% of the entire particles have a difference in particle diameter within 10%. More preferably, the particles are spheres or generally spherical polyhedrons.

With respect to the composition of yttrium-europium oxide and yttrium-gadolinium-europium oxide, the yttrium-europium oxide consists essentially of 99 to 85% by weight yttrium oxide and 1 to 15% by weight europium oxide, and the yttrium-gadolinium-europium oxide consists essentially of 10 to 95% by weight yttrium oxide, 1 to 85% by weight gadolinium oxide and 1 to 15% by weight europium oxide. In addition to the yttrium, gadolinium and europium oxides, up to 1% by weight of another rare earth oxide may be contained to form a complex oxide. Herein the content of boron and barium combined should preferably be 20 ppm or less.

Crystal grains in the yttrium-europium oxide and yttrium-gadolinium-europium oxide should preferably have a size of at least 650 Å as measured by Wilson method utilizing x-ray diffraction.

The yttrium-europium oxide phosphor or yttrium-gadolinium-europium oxide phosphor are prepared by heating a consistent, spherical, coprecipitated yttrium-europium oxide or yttrium-gadolinium-europium oxide having a uniform particle diameter of 0.5 to 2 μm at a temperature of 1,100 to 1,800° C.

Figure 5A:
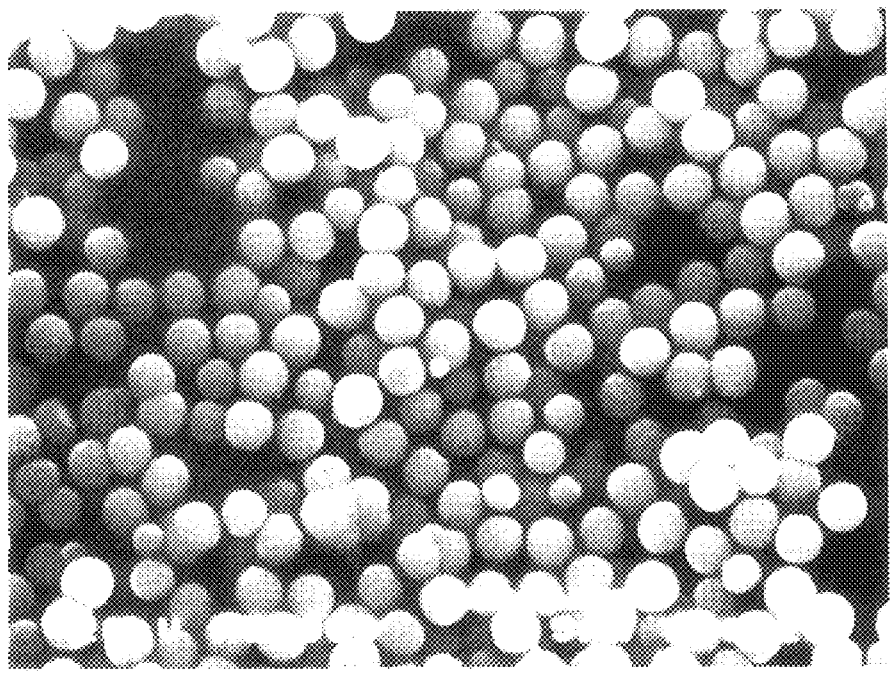
FIGS. 5A and 5B are photomicrographs of monodisperse spherical particles of coprecipitated yttrium-europium oxide.
Figure 5B:
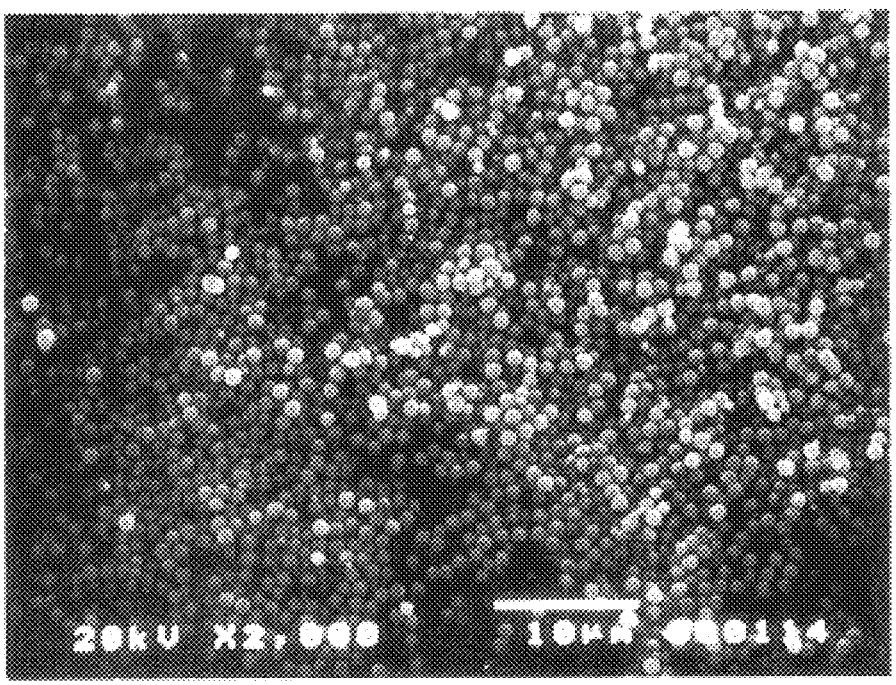
Figure 6:
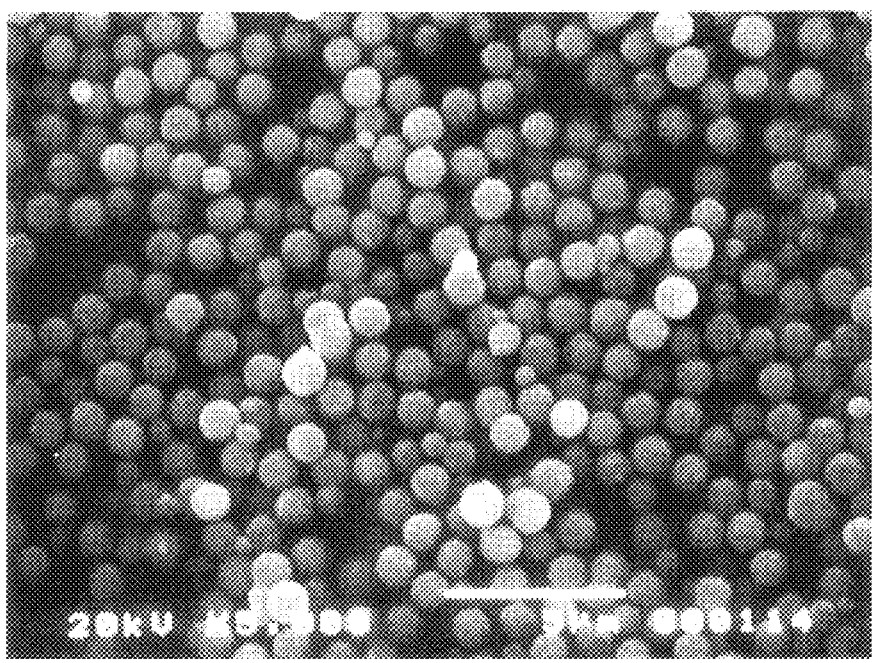
FIG. 6 is a photomicrograph of a yttrium-europium oxide phosphor obtained by heat treating the coprecipitated oxide at 1,100° C.
Figure 7:
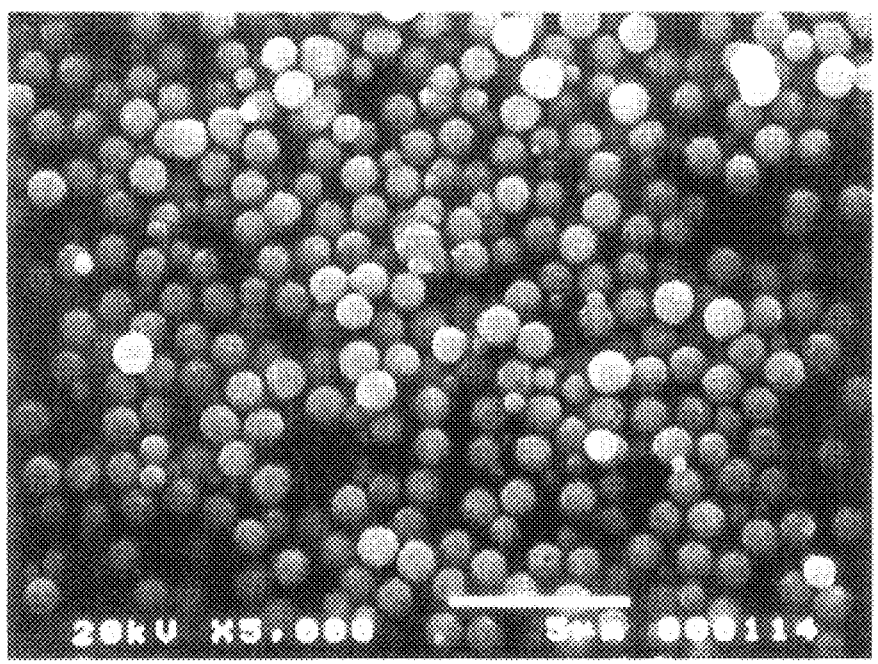
FIG. 7 is a photomicrograph of a yttrium-europium oxide phosphor obtained by heat treating the coprecipitated oxide at 1,200° C.
Figure 8:
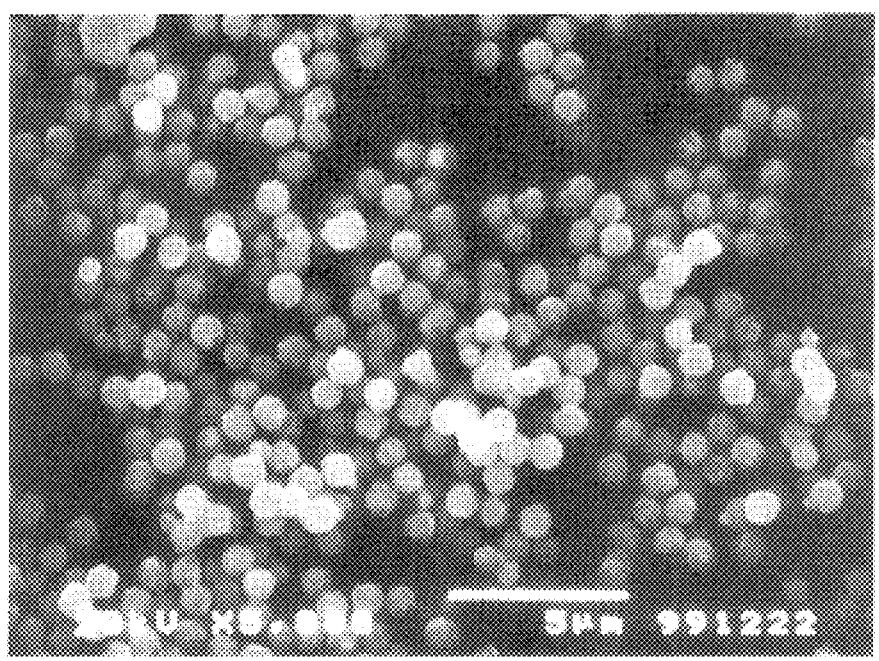
FIG. 8 is a photomicrograph of a yttrium-europium oxide phosphor obtained by heat treating the coprecipitated oxide at 1,400° C.
Figure 9:
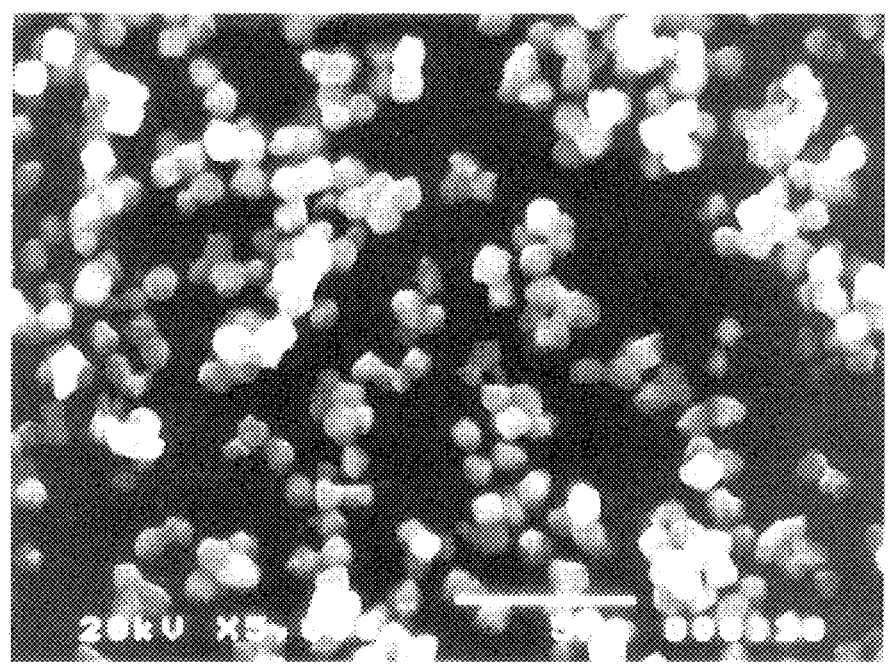
FIG. 9 is a photomicrograph of a yttrium-europium oxide phosphor obtained by heat treating the coprecipitated oxide at 1,650° C.

The coprecipitated rare earth oxide used herein as the raw material and its preparation method are as described above. Consistent, spherical, coprecipitated rare earth oxide particles having an average particle diameter of 0.5 to 2 μm prepared as above, for example, monodisperse, spherical, coprecipitated yttrium-europium oxide particles as shown in FIG. 5 may be used as the raw material.

Crystal grains in the coprecipitated yttrium-europium oxide or yttrium-gadolinium-europium oxide particles have a size of about 200 to 400 Å as measured by Wilson method utilizing x-ray diffraction. For use as a phosphor, crystal growth in the starting oxide particles is necessary. It is noted that the term "spherical shape" of particles means that particles have substantially equal major and minor diameters; and the term "uniform particle diameter" used herein means that when particles are observed under an electron microscope, at least 90% of the entire particles have a difference in particle diameter within 10%. The phosphor particles obtained have an average particle diameter which is substantially equal to that of the starting oxide.

The composition of yttrium-europium oxide or yttrium-gadolinium-europium oxide serving as the coprecipitated rare earth oxide used as the raw material herein is the same as the corresponding phosphor. Specifically, for the yttrium-europium oxide, a starting coprecipitated rare earth oxide consisting essentially of 99 to 85% by weight yttrium oxide and 1 to 15% by weight europium oxide may be used. For the yttrium-gadolinium-europium oxide, a starting coprecipitated rare earth oxide consisting essentially of 10 to 95% by weight yttrium oxide, 1 to 85% by weight gadolinium oxide and 1 to 15% by weight europium oxide may be used. Up to 1% by weight of another rare earth element oxide may be contained to form a complex oxide.

When a yttrium-europium oxide phosphor or yttrium-gadolinium-europium oxide phosphor was prepared in the prior art, it was a common practice to admix the raw material with a flux such as boric acid (or boron oxide), barium chloride or ammonium chloride, followed by heat treatment. The main purpose of adding the flux is to promote crystal growth. Since the phosphor resulting from crystal growth shows better results with respect to emission intensity and lifetime when it is free of the flux, the flux left within the phosphor or on the phosphor surface is usually removed as by washing. However, some of the flux can be left within the phosphor even after the washing or other removal step, and the residual flux has detrimental effects on the emission intensity and lifetime of the phosphor.

The phosphor contemplated in the present invention is a phosphor having a uniform particle diameter of 0.5 to 2 μm and having improved color purity and lifetime because it is produced by heat treating the microparticulate, monodisperse, spherical, coprecipitated rare earth oxide according to the present invention and in this case, crystals can be fully grown within the particles only by heat treatment without the aid of the flux. If the raw material has a differing particle diameter, the flux must be added because the temperature of crystal growth differs among individual particles. As opposed to this, the particles used herein have a uniform particle diameter so that similar crystal growth takes place at substantially the same temperature, which also eliminates a need for the flux. As a result, the content of boron and barium in the phosphor can be restrained as low as 20 ppm or below.

Since the starting oxide is directly converted into a phosphor without adding the flux, the present invention eliminates the step of washing the phosphor for removing the flux, offering an overall simple process for phosphor preparation.

Specifically, the phosphor is produced by placing a starting coprecipitated oxide in an alumina crucible and heat treating it in an electric oven. By heating at a temperature of 1,100 to 1,800° C., preferably 1,200 to 1,700° C., especially 1,300 to 1,600° C., for about 10 minutes to about 6 hours, a phosphor can be produced. The heat treatment is carried out in order to help crystals grow in the starting oxide. When phosphor samples as heat treated were observed under a transmission electron microscope, it was found that at a heat treating temperature below 1,100° C., crystal growth occurred, but at a slow rate. In practice, heat treatment at or above 1,100° C. is necessary for crystal growth to take place. For this reason, heat treatment is carried out at a temperature of 1,100 to 1,800° C., preferably 1,200 to 1,700° C., especially 1,300 to 1,600° C. Heating above 1,800° C. may cause particles to agglomerate to a size in excess of 2 µm, even to several microns, resulting in a mixture of spherical particles of 0.5 to 2 µm and particles of larger size, which is non-uniform and ineffective to coat.

When the phosphor obtained according to the invention was observed by photomicrography (Nippon Electron K. K.), it consisted of monodisperse, substantially spherical particles having a diameter substantially equal to that of the starting coprecipitated oxide.

The rare earth oxide phosphor thus obtained is characterized by a uniform particle diameter of 0.5 to 2 µm which has never been available in the prior art, and useful as a red phosphor for use in displays and medical diagnostic x-ray systems.

EXAMPLE

Examples of the invention are given below by way of illustration and not by way of limitation.

Example 1

In a 10-liter glass beaker, an aqueous solution of yttrium and europium nitrates (Y/Eu=10/1 by weight) was prepared to a concentration of 10 g/liter. Water used in this and other Examples are deionized water having a silicon content of less than 5 ppm. The solution was heated at 95° C., and urea was added so as to give an initial concentration of 30 g/liter. While the urea concentration was inspected at intervals of 30 minutes, urea was replenished so as to keep a urea concentration of approximately 30 g/liter. In this way heating was continued for 5 hours, at the end of which urea replenishment was interrupted. The solution was heated at 95° C. for a further 2 hours, and fed to a Buchner funnel, on which the precipitate was collected. The resulting cake was dried and observed under an electron microscope to find substantially monodisperse spherical particles having a particle diameter of about 1.5 µm. The Fisher diameter of the particles was also measured to be 1.4 µm which was substantially the same value as the particle diameter from electron microscope observation. Upon further analysis of the precipitate, it was found to be an amorphous basic carbonate. The cake resulting from filtration was fired at 700° C. for 2 hours, yielding an oxide. Observation under an electron microscope revealed that it was substantially monodisperse spherical particles having a particle diameter of about 1.2 µm. The Fisher diameter of the particles was also measured to be 1.2 µm.

Example 2

In a glass-lined vessel of 1,000 liters, an aqueous solution of a mixture of chlorides of yttrium, gadolinium and europium (Y/Gd/Eu=5/5/1 by weight) was prepared to a concentration of 8 g/liter. The solution was heated at 92° C., and urea was added so as to give an initial concentration of 40 g/liter. While the urea concentration was inspected at intervals of 30 minutes, urea was replenished so as to keep a urea concentration of approximately 40 g/liter. In this way heating was continued for 5 hours, at the end of which urea replenishment was interrupted. The solution was heated at 92° C. for a further 2 hours, and fed to a Buchner funnel, on which the precipitate was collected. The resulting cake was dried and observed under an electron microscope to find substantially monodisperse spherical particles having a particle diameter of about 2.0 µm. The Fisher diameter of the particles was also measured to be 2.0 µm which was substantially the same value as the particle diameter from electron microscope observation. Upon further analysis of the precipitate, it was found to be an amorphous basic carbonate. The cake resulting from filtration was fired at 600° C. for 10 hours, yielding an oxide. Observation under an electron microscope revealed that it was substantially monodisperse spherical particles having a particle diameter of about 1.6 µm. The Fisher diameter of the particles was also measured to be 1.55 µm.

Comparative Example 1

In a glass-lined vessel of 1,000 liters, an aqueous solution of a mixture of chlorides of yttrium, gadolinium and europium (Y/Gd/Eu=5/5/1 by weight) was prepared to a concentration of 8 g/liter. The solution was heated at 92° C., and urea was added so as to give an initial concentration of 40 g/liter. While the urea concentration was inspected at intervals of 30 minutes, urea was replenished to increase the urea concentration stepwise until the urea concentration reached 60 g/liter. In this way heating was continued for 5 hours, at the end of which urea replenishment was interrupted. The solution was heated at 92° C. for a further 2 hours, and fed to a Buchner funnel, on which the precipitate was collected. The resulting cake was dried and observed under an electron microscope to find substantially monodisperse spherical particles having an inconsistent particle diameter ranging from about 1.2 µm to about 0.2 µm. The Fisher diameter of the particles was also measured to be 0.8 µm. Upon further analysis of the precipitate, it was found to be an amorphous basic carbonate. The cake resulting from filtration was fired at 600° C. for 10 hours, yielding an oxide. Observation under an electron microscope revealed that it was monodisperse spherical particles having an inconsistent particle diameter ranging from about 1.0 µm to about 0.2 µm. The Fisher diameter of the particles was also measured to be 0.6 µn.

Comparative Example 2

In a glass-lined vessel of 1,000 liters, an aqueous solution of a mixture of chlorides of yttrium, gadolinium and europium (Y/Gd/Eu=5/5/1 by weight) was prepared to a concentration of 8 g/liter. The solution was heated at 92° C., and urea was added so as to give an initial concentration of 40 g/liter. In this state, the solution was heated for 5 hours, and fed to a Buchner funnel, on which the precipitate was collected. The resulting cake was dried and observed under an electron microscope to find agglomerated particles having an inconsistent particle diameter. The Fisher diameter of the particles was also measured to be 3.8 µm. Upon further analysis of the precipitate, it was found to be an amorphous basic carbonate. The cake resulting from filtration was fired at 600° C. for 10 hours, yielding an oxide. Observation under an electron microscope revealed that it was agglomerated particles having an inconsistent particle diameter. The Fisher diameter of the particles was also measured to be 3.5 µm.

FIGS. 1, 2, 3 and 4 are photomicrographs (magnifying power×5,000) of the oxides obtained in Example 1, Example 2, Comparative Example 1 and Comparative Example 2, respectively.

Example 3

There were synthesized consistent, spherical, monodisperse, coprecipitated yttrium-europium oxide particles having the composition of yttrium oxide and europium oxide in a weight ratio of 94:6 and a uniform particle diameter of about 1.0 μm. The conditions under which this raw material oxide was synthesized are described below.

Deionized water was heated at a substantially constant temperature above 90° C. A solution of mixed yttrium/europium nitrates in a weight ratio of 94:6 calculated as oxide and urea were added to the water, which was continuously heated. More specifically, the solution of mixed yttrium/europium nitrates as in Example 1 and urea were added so as to adjust to a rare earth ion concentration of less than 20 g/liter and a urea concentration of less than 50 g/liter whereby basic carbonate particles having a uniform particle diameter of about 1.2 μm precipitated. The basic carbonate was fired at 800° C. for 2 hours, obtaining consistent, spherical, coprecipitated yttrium-europium oxide particles serving as the raw material and as shown in FIG. 5. The Fisher diameter was 1.2 μm.

Using an electric oven, the coprecipitated oxide particles were heat treated in air at 1400° C. for 5 hours. The resulting phosphor was observed under an electron microscope to find that it was monodisperse particles of generally spherical polyhedron having a particle diameter of about 1 μm. The Fisher diameter was 1.3 μm. Upon observation of the particles under an electron microscope, the difference in particle diameter was about 7% for more than 90% of particles. The boron and barium contents in the phosphor were measured to be both below 5 ppm.

When the phosphor was applied to a glass substrate in a coverage of 30 mg/cm$^2$, a uniform coating was obtained. The phosphor was measured for emission spectrum using an excitation light source of 147 nm. The fluorescence spectrum had a sharp emission peak at about 612 nm.

FIGS. 6 to 10 are photomicrographs of a series of phosphors obtained by heat treating the above coprecipitated oxide at different temperatures. FIGS. 6, 7, 8, 9 and 10 correspond to the yttrium-europium oxide phosphors heat treated at a temperature of 1,100° C., 1,200° C., 1,400° C., 1,650° C. and 1,850° C., respectively.

Table 1 shows the heat treating temperature and the size of crystal grains in the yttrium-europium oxide phosphor. The heating time was 2 hours. The size of grains was measured by Wilson method utilizing x-ray diffraction.

TABLE 1

| Heat treating temperature (° C.) | Size of grains (Å) |
|---|---|
| 800 | 200–300 |
| 1200 | 700–750 |
| 1400 | 800–900 |
| 1600 | ≥900 |

Figure 10:
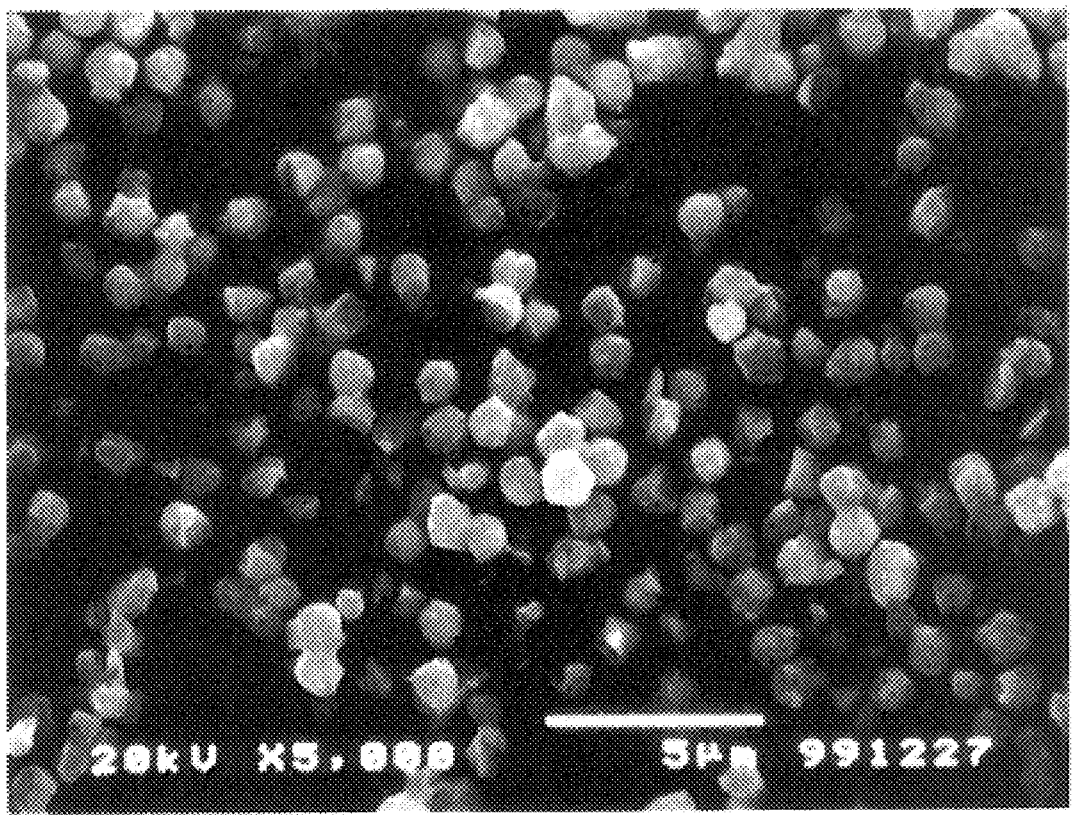
FIG. 10 is a photomicrograph of a yttrium-europium oxide phosphor obtained by heat treating the coprecipitated oxide at 1,850° C.
Figure 11:
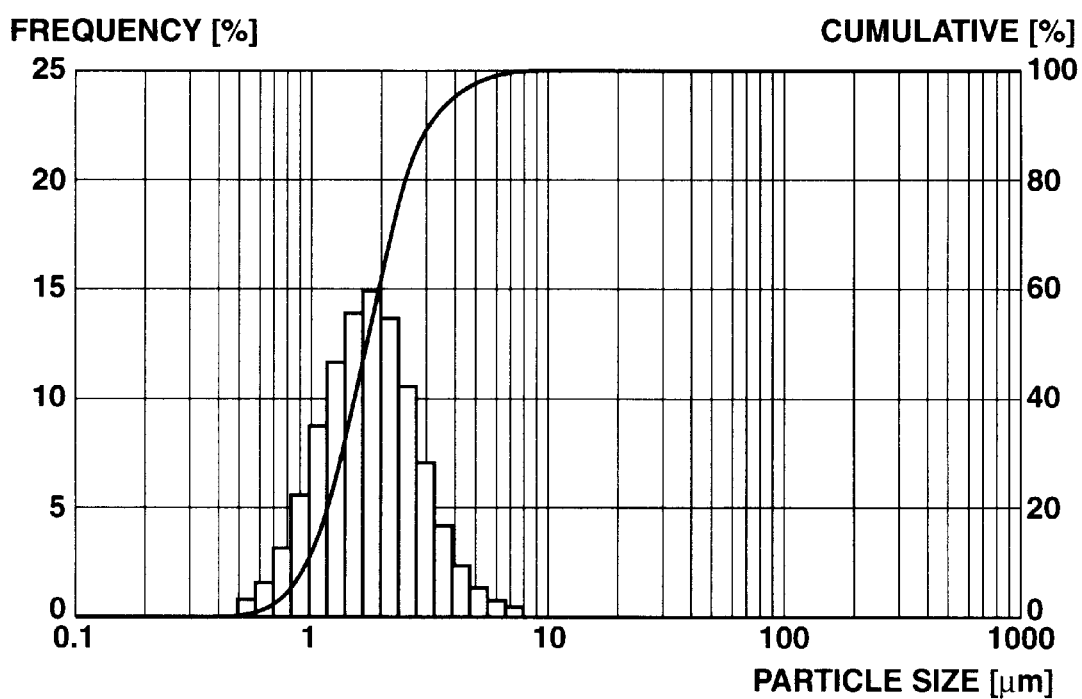
FIG. 11 is a diagram showing the particle size distribution of a yttrium-europium oxide phosphor obtained by heat treating the coprecipitated oxide at 1,400° C.

Using a particle size distribution tester of the laser scattering type (Leed & Northrup), the particle size distribution of the phosphor obtained by heat treating at 1,400° C. was measured. The results are shown in FIG. 11. Many agglomerated particles are actually found in photomicrographs as shown in FIG. 10, with some particles reaching a particle diameter in excess of several microns. The phosphor was a non-uniform mixture of spherical particles and non-spherical particles. With respect to the phosphor's coating property, monodisperse, consistent particles are most preferred whereas fused particles are undesirable in that they exacerbate the coating property.

Figure 12:
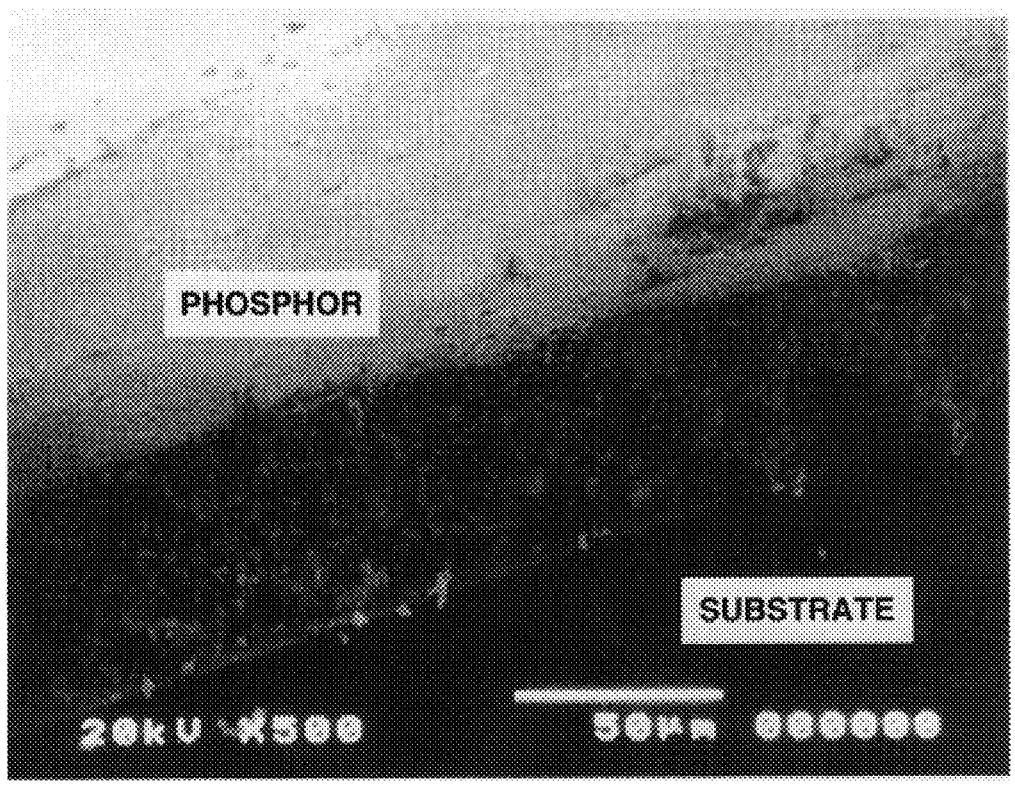
FIG. 12 is a photomicrograph of a phosphor coating on a substrate.

Also, the phosphor resulting from heat treatment at 1,400° C. was applied to a substrate, which coating was observed under an electron microscope. It is seen from FIG. 12 that the phosphor was very closely packed on the substrate.

Further, the phosphors resulting from heat treatment at different temperatures were measured for fluorescence spectrum. The instrument used was a vacuum ultraviolet spectral system B-95100 by Bunko Keiki K. K. operating at an excitation wavelength of 147 nm. Comparison was made in terms of the emission intensity at 612 nm. A measurement sample was prepared by applying the phosphor onto a glass substrate in a coverage of 30 mg/cm$^2$. A relative intensity of emission on the surface where the exciting light impinged was measured. The results are shown in Table 2. It was found that the relative intensity of emission at 612 nm produced by the exciting light of 147 nm was higher for those phosphors heat treated at 1,300 to 1,700° C.

TABLE 2

Relative emission intensity of fluorescence at 612 nm produced by exciting light 147 nm, based on an emission peak intensity of 1.00 for 1,300° C. heat treated phosphor

| Heat treating temperature (° C.) | Relative emission intensity |
|---|---|
| 1000 | 0.72 |
| 1300 | 1.00 |
| 1400 | 1.05 |
| 1600 | 1.03 |
| 1700 | 1.01 |

Example 4

There were synthesized consistent, spherical, monodisperse, coprecipitated yttrium-gadolinium-europium oxide particles having the composition of yttrium oxide, gadolinium oxide and europium oxide in a weight ratio of 40:54:6 and a uniform particle diameter of about 1.0 μm. The conditions under which this raw material oxide was synthesized are described below.

Deionized water containing less than 5 ppm of Si was heated at a substantially constant temperature above 90° C. A solution of mixed yttrium/gadolinium/europium nitrates as in Example 1 in a weight ratio of 40:54:6 calculated as oxide and urea were added to the water, which was continuously heated. More specifically, the solution of mixed yttrium/gadolinium/europium nitrates and urea were added so as to adjust to a rare earth ion concentration of less than 20 g/liter and a urea concentration of less than 50 g/liter whereby basic carbonate particles having a uniform particle diameter of about 1.2 μm precipitated. The Fisher diameter was 1.3 μm. The basic carbonate was fired at 800° C., obtaining consistent, spherical, coprecipitated yttrium-gadolinium-europium oxide particles serving as the raw material.

Using an electric oven, the coprecipitated oxide particles were heat treated in air at 1400° C. for 5 hours. The resulting phosphor was observed under an electron microscope to find that it was monodisperse particles of generally spherical polyhedron having a particle diameter of about 1 μm. The Fisher diameter was 1.2 μm. The boron and barium contents in the phosphor were measured to be both below 5 ppm.

When the phosphor was applied to a glass substrate in a coverage of 20 mg/cm$^2$, a uniform coating was obtained as ascertained from its photomicrograph. The phosphor was measured for emission spectrum using an excitation light source of 147 nm. The fluorescence spectrum had a sharp emission peak at about 612 nm.

Comparative Example 3

Amorphous coprecipitated yttrium-europium oxide particles having the composition of yttrium oxide and europium oxide in a weight ratio of 94:6 and an average particle diameter of about 1 μm were synthesized by firing oxalate precipitates.

Using an electric oven, the coprecipitated oxide particles were heat treated in air at 1400° C. for 5 hours. The resulting phosphor was observed under an electron microscope to find that it was particles of variant shape having a differing diameter. The mean particle size was 1.5 μm and the Fisher diameter was 1.5 μm.

When the phosphor was applied to a glass substrate in a coverage of 30 mg/cm², a uniform coating was obtained. The phosphor was measured for emission spectrum using an excitation light source of 147 nm. The emission peak at about 612 nm had an intensity of about 95% of that in Example 3.

Comparative Example 4

Amorphous coprecipitated yttrium-gadolinium-europium oxide particles having the composition of yttrium oxide, gadolinium oxide and europium oxide in a weight ratio of 40:54:6 and an average particle diameter of about 1 μm were synthesized by firing oxalate precipitates.

To the oxide were added 0.1% by weight of boric acid, 1% by weight of barium chloride and 1% by weight of ammonium chloride as a flux component. This was fired at 1200° C. for 5 hours and washed with water. The resulting phosphor was observed under an electron microscope to find that it was particles of variant shape having a differing diameter. The boron and barium contents in the phosphor were measured to be about 20 ppm and about 100 ppm, respectively. The mean particle size was 2 μm and the Fisher diameter was 2 μm.

When the phosphor was applied to a glass substrate in a coverage of 30 mg/cm²₁ a uniform coating was obtained. The phosphor was measured for emission spectrum using an excitation light source of 147 nm. The emission peak at about 612 nm had an intensity of about 97% of that in Example 4.

Japanese Patent Application Nos. 2000-203549 and 2000-391055 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A rare earth oxide in the form of substantially monodisperse, substantially spherical particles having an average particle diameter Df of 0.5 μm<Df<2.0 μm, as measured by a Fisher sub-sieve sizer, and an average particle diameter De of 0.5 μm<De<2.0 μm, as observed under an electron microscope, the Df and De diameters being substantially the same, wherein the particles have a uniform particle diameter, such that, when observed under an electron microscope, at least 90% of the entire particles have a difference in particle diameter within 10%.

2. The rare earth oxide of claim 1 which contains at least 60 mol % of an oxide of at least one element selected from the group consisting of Y, Gd, Tb, Dy, Ho, Er, Tm, Yb, and Lu and 40 mol % or less of an oxide of at least one element selected from the group consisting of La, Ce, Pr, Nd, Sm, and Eu.

3. A method for preparing the rare earth oxide of claim 1, which comprises firing a basic rare earth carbonate in the form of substantially monodisperse, substantially spherical amorphous particles having an average particle diameter Df of 1.0 μm<Df<3.0 μm, as measured by a Fisher sub-sieve sizer, and an average particle diameter De of 1.0 μm<De<3.0 μm as, observed under an electron microscope, the Df and De diameters being substantially the same.

4. The method of claim 3 wherein the firing temperature is at least 600° C.

5. A method for preparing the rare earth oxide of claim 1, comprising:
maintaining an aqueous solution of water-soluble rare earth salts and urea, the urea in an initial concentration of up to 50 g/liter, at a temperature of at least 80° C., while inspecting the urea concentration and adding urea to the aqueous solution so as to keep the concentration of urea substantially constant to the initial concentration, thereby forming a basic rare earth carbonate, and
firing the basic rare earth carbonate.

6. The method of claim 5, wherein the initial urea concentration is 25 to 50 g/liter of the solution and the concentration of water-soluble rare earth salts is 2 to 20 g/liter.

7. The method of claim 5, wherein the urea concentration is maintained to within ±10 g/liter of the initial urea concentration.

8. A phosphor obtained by heating a rare earth oxide of claim 1 to cause the oxide to undergo crystal growth.

9. The phosphor of claim 8 which contains at least 60 mol % of an oxide of at least one element selected from the group consisting of Y, Gd, Tb, Dy, Ho, Er, Tm, Yb, and Lu and 40 mol % or less of an oxide of at least one element selected from the group consisting of La, Ce, Pr, Nd, Sm, and Eu.

10. The method of claim 8, wherein the heating of the rare earth oxide to cause the oxide to undergo crystal growth is conducted without the use of a flux.

11. A method for preparing a yttrium-europium oxide phosphor, comprising heating a consistent, substantially spherical, substantially monodisperse, coprecipitated yttrium-europium oxide according to claim 1 and having a uniform particle diameter of 0.5 μm to 2 μm at a temperature between 1,100° C. and 1,800° C., thereby yielding a yttrium-europium oxide phosphor having the same particle diameter as the coprecipitated oxide.

12. A method for preparing a yttrium-gadolinium-europium oxide phosphor, comprising the step of heating a consistent, spherical, coprecipitated yttrium-gadolinium-europium oxide according to claim 1 having a uniform particle diameter of 0.5 μm to 2 μm at a temperature between 1,100° C. and 1,800° C., thereby yielding a yttrium-gadolinium-europium oxide phosphor having the same average particle diameter as the coprecipitated oxide.

13. The rare earth oxide of claim 1, wherein Df is in the range of 1.0 μm<Df<2.0 μm and De is in the range of 1.0 μm<Dc<2.0 μm.

14. A rare earth oxide of claim 1, prepared by a method comprising:
maintaining an aqueous solution of water-soluble rare earth salts and urea, the urea in an initial concentration of up to 50 g/liter, at a temperature of at least 80° C., while inspecting the urea concentration and adding urea to the aqueous solution so as to keep the concentration of urea substantially constant to the initial concentration, thereby forming a basic rare earth carbonate, and firing the basic rare earth carbonate.

15. A basic rare earth carbonate in the form of substantially monodisperse, substantially spherical amorphous particles having an average particle diameter Df of 1.0 μm<Df<3.0 μm as measured by a Fisher sub-sieve sizer, and an average particle diameter De of 1.0 $\mu$m<De<3.0 $\mu$m as, observed under an electron microscope, the Df and De diameters being substantially the same, wherein the particles have a uniform particle diameter, such that, when observed under an electron microscope, at least 90% of the entire particles have a difference in particle diameter within 10%.

16. The basic rare earth carbonate of claim 15 which contains at least 60 mol % of a basic carbonate of at least one element selected from the group consisting of Y, Gd, Tb, Dy, Ho, Er, Tm, Yb, and Lu and 40 mol % or less of a basic carbonate of at least one element selected from the group consisting of La, Ce, Pr, Nd, Sm, and Eu.

17. A method for preparing the basic rare earth carbonate of claim 15 comprising:

maintaining an aqueous solution of water-soluble rare earth salts and urea, the urea in an initial concentration of up to 50 g/liter, at a temperature of at least 80° C., while inspecting the urea concentration and adding urea to the aqueous solution so as to keep the concentration of urea substantially constant to the initial concentration, thereby forming the basic rare earth carbonate.

18. The method of claim 17 wherein said aqueous solution is prepared using deionized water having a silicon content of up to 0.5 ppm.

19. The method of claim 17, wherein the initial urea concentration is 25 to 50 g/liter of the solution and the concentration of water-soluble rare earth salts is 2 to 20 g/liter.

20. The method of claim 17, wherein the urea concentration is maintained to within ±10 g/liter of the initial urea concentration.

21. A basic rare earth carbonate of claim 15, prepared by a method comprising:

maintaining an aqueous solution of water-soluble rare earth salts and urea, the urea in an initial concentration of up to 50 g/liter, at a temperature of at least 80° C., while inspecting the urea concentration and adding urea to the aqueous solution so as to keep the concentration of urea substantially constant to the initial concentration, thereby forming the basic rare earth carbonate.

22. A consistent yttrium-europium oxide phosphor having a uniform particle diameter of 0.5 $\mu$m to 2 $\mu$m and being in the form of substantially monodisperse, substantially spherical particles having an average particle diameter Df of 0.5 $\mu$m<Df<2.0 $\mu$m, as measured by a Fisher sub-sieve sizer, and an average particle diameter De of 0.5 $\mu$m<De<2.0 $\mu$m, as observed under an electron microscope, the Df and De diameters being substantially the same, wherein the particles have a uniform particle diameter, such that, when observed under an electron microscope, at least 90% of the entire particles have a difference in particle diameter within 10%.

23. The yttrium-europium oxide phosphor of claim 22 wherein the content of boron and barium combined is not greater than 20 ppm.

24. A consistent yttrium-gadolinium-europium oxide phosphor having a uniform particle diameter of 0.5 $\mu$m to 2 $\mu$m and being in the form of substantially monodisperse, substantially spherical particles having an average particle diameter Df of 0.5 $\mu$m<Df<2.0 $\mu$m, as measured by a Fisher sub-sieve sizer, and an average particle diameter De of 0.5 $\mu$m<De<2.0 $\mu$m, as observed under an electron microscope, the Df and De diameters being substantially the same, wherein the particles have a uniform particle diameter, such that, when observed under an electron microscope, at least 90% of the entire particles have a difference in particle diameter within 10%.

25. The yttrium-europium oxide phosphor of claim 24 wherein the content of boron and barium combined is not greater than 20 ppm.

26. A ceramic obtained from a rare earth oxide in the form of substantially spherical particles having an average particle diameter Df of 0.5 $\mu$m<Df<2.0 $\mu$m, as measured by a Fisher sub-sieve sizer, and a particle diameter De of 0.5 $\mu$m<De<2.0 $\mu$m, as observed under an electron microscope, the Df and De diameters being substantially the same, wherein the particles have a uniform particle diameter, such that, when observed under an electron microscope, at least 90% of the entire particles have a difference in particle diameter within 10%.

27. The ceramic of claim 26 which contains at least 60 mol % of an oxide of at least one element selected from the group consisting of Y, Gd, Tb, Dy, Ho, Er, Tm, Yb, and Lu and 40 mol % or less of an oxide of at least one element selected from the group consisting of La, Ce, Pr, Nd, Sm, and Eu.

* * * * *